March 2, 1954   J. J. DELANY   2,670,757
COMBINATION CHECK VALVE AND UNION
Filed Aug. 19, 1949
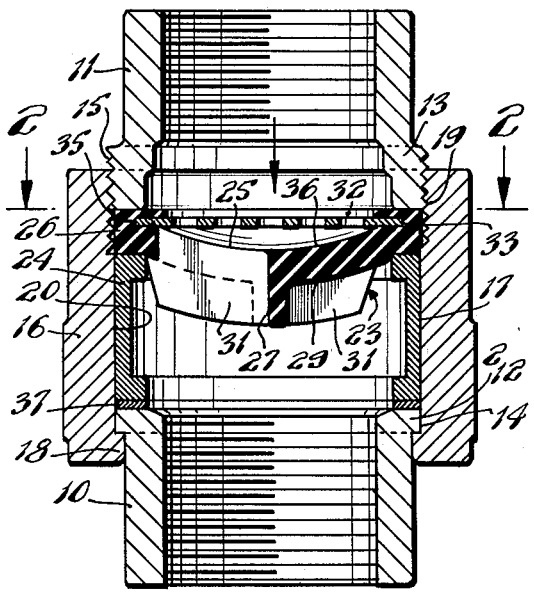
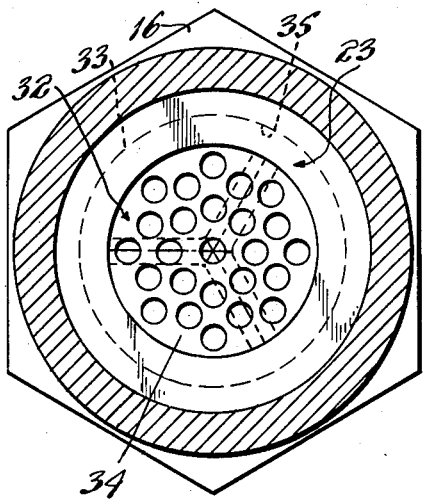
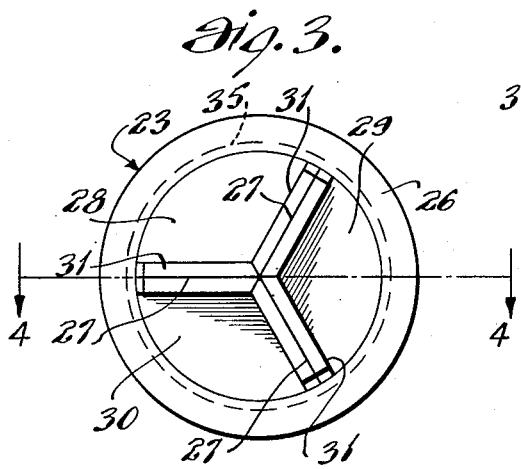
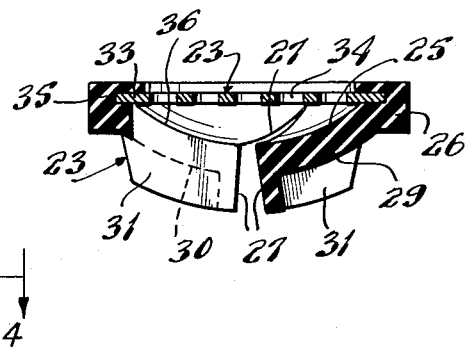
INVENTOR.
JOHN J. DELANY
BY Clark & Ott
ATTORNEYS

Patented Mar. 2, 1954

2,670,757

UNITED STATES PATENT OFFICE 2,670,757

COMBINATION CHECK VALVE AND UNION

John J. Delany, Brooklyn, N. Y., assignor to Delany Realty Corporation, New York, N. Y., a corporation of New York Application August 19, 1949, Serial No. 111,157

3 Claims. (Cl. 137—515)

This invention relates to a combination check valve and union.

An object of the invention is to provide a check valve and union which takes up a minimum amount of space and can be employed where it would be difficult to accommodate a check valve and a union in separate fittings.

Another object of the invention is to provide a check valve and union which is applicable for use in any type of installation, which can be arranged in angular position and which provides a positive checking of the flow therethrough.

Another object of the invention is to provide a check valve and union which is constructed and arranged to permit of convenient installation thereof, which may be readily repaired, and which eliminates noise of moving parts.

Still another object of the invention is to provide a check valve in which the valve element is resilient and includes arcuate sectors adapted to be flexed by the pressure of the fluid to spread the same apart so as to permit of the flow of the fluid therethrough and which valve element is backed by a metallic spider to retain the arcuate sectors against flexing in the opposite direction.

Still another object of the invention is to provide a check valve of said character in which the valve element consists of a resilient wall disposed transversely of the flow of the fluid and which is of arcuate formation in cross-section and is provided with radially disposed slits forming a plurality of arcuate sectors adapted to be flexed by the pressure of the fluid to spread the same apart to permit of the flow of the fluid therethrough.

With the foregoing and other objects in view, reference is now made to the following specification and accompanying drawings in which the preferred embodiment of the invention is illustrated.

In the drawings:

Fig. 1 is a longitudinal sectional view through a check valve and union constructed in accordance with the invention.

Fig. 2 is a transverse sectional view taken approximately on line 2—2 of Fig. 1.

Fig. 3 is a face view of the check valve removed from the union.

Fig. 4 is a transverse sectional view therethrough taken approximately on line 4—4 of Fig. 3 showing the same with parts of the confronting wall spread apart to dispose the same in open relation.

Referring to the drawings by characters of reference, the combination check valve and union includes oppositely disposed interiorly threaded tubular ends 10 and 11 having outwardly projecting peripheral flanges 12 and 13 respectively at their inner ends, the flange 12 having a plane peripheral face 14 while the flange 13 has its outer periphery threaded as at 15.

The tubular ends 10 and 11 are adapted to be coupled together by means of a nut 16 which is of hexagonal shape in cross-sectional configuration and is formed with an axial bore 17 opening through the opposite ends thereof. The nut is provided with an inwardly directed annular flange 18 at one end and at its opposite end the same is provided with an interiorly threaded portion 19, and between the flange 18 and the interiorly threaded portion 19 the inner periphery 20 of the nut is relatively smooth. The nut 16 engages about the inner end of the tubular end 10 with the inwardly directed flange 18 engaging against the outwardly directed flange 14 to dispose the outer portion of the tubular end 10 in protruding relation from the nut and permitting of the turning of the nut with reference to said tubular end for tightening the nut on the threaded flange 13 of the tubular end 11.

The nut is provided with a resilient valve element 23 which is disposed between the tubular end 11 and an annular sleeve 24 snugly fitting the inner periphery 20 of the nut. The valve element 23 is fashioned of flexible resilient material such as rubber composition and the same includes a partition wall 25 of arcuate shape in cross-sectional configuration surrounded by an enlarged peripheral rim 26 with the partition wall 25 arranged transversely of the flow of the fluid through the union. The said wall is provided with a plurality of radially arranged slits 27, three being shown in the embodiment illustrated, but it is to be understood that the same may be provided with any number of slits 27 which extend from the center thereof to the peripheral rim 26. This divides the partition wall 25 into three resilient sectors 28, 29 and 30 each of which subtends an arc of 120° and along the slits 27 the said sectors are each formed with outwardly projecting flanges 31.

The partition wall 25 is backed by a metallic plate 32 which includes a peripheral rim 33 and a foraminated central portion 34. The rim 33 is disposed in an annular recess 35 formed in the peripheral rim 26 of the valve element 23 at the base of the partition wall 25 with the foraminated central portion 34 disposed in spaced relation from the concave rear face 36 of said partition wall.

The valve element 23 is held in position between the sleeve 24 and the tubular end 11 by the tightening of the nut 16 on the threaded flange 13 of said tubular end which also retains the metallic plate 32 in position at the rear of said valve element. A gasket 37 is preferably arranged between the flange 14 of the tubular end 10 and the adjacent end of the sleeve 24 for preventing leakage about the flange 14.

The tubular ends 10 and 11 are adapted to threadedly receive the ends of pipes for coupling the same together for the flow of fluid in the direction of the arrow shown in Fig. 1 of the drawings. The kinetic pressure of the fluid will flex the arcuate shaped sectors 28, 29 and 30 in the direction of flow or away from the metallic plate 32 so as to spread the same apart and provide an axial opening between the inner ends thereof as illustrated in Fig. 4 of the drawings for the passage of fluid therethrough. It will be understood that the flanges 31 resiliently tension the arcuate sectors against too free flexing and function to return to sectors to abutting closed relation when the pressure of the fluid on opposite sides of the valve element is equal.

The arcuate sectors 28, 29 and 30 are inherently flexible and resilient and are normally retained with the slits 27 in closed formation and the flanges 31 of adjacent sectors in abutting engagement. The arcuate formation of the partition wall 25 together with the flanges 31 and the metallic plate 32, function to prevent flexing of the arcuate sectors to the right of the closed position shown in Fig. 1 of the drawing or in a direction opposed to the normal flow of the fluid as indicated by the arrow in Fig. 1. The valve element 23 thus permits of the flow of the fluid in one direction through the union but prevents counter-flow thereof.

The arrangement of the valve element 23 within the nut 16 permits of the convenient removal and replacement of the valve element without disturbing or spreading apart of the ends of the pipes connected with the tubular ends 10 and 11. Furthermore, the valve element 23 will function as a check valve irrespective of the angular relation or position of the union.

What is claimed is:

1. In a fitting of the character described, oppositely disposed interiorly threaded tubular ends, one of said tubular ends having a peripheral flange and the other having an exteriorly threaded portion, a nut having an axial bore and formed with an inwardly directed annular flange at one end and an interiorly threaded portion at the opposite end and adapted to engage the peripheral flange and the exteriorly threaded portion of the tubular ends for coupling the tubular ends together, a sleeve fitted within said nut, and a valve element of disk-shaped formation consisting of a peripheral rim surrounded by and connected with a resilient partition wall disposed transversely of the flow of the fluid through said nut and located at one end of said sleeve with said peripheral rim secured between said end of the sleeve and one of said tubular ends, said partition wall being slitted to provide flexible sectors each connected with said partition wall and adapted to resiliently flex to spread the sectors apart with the pressure of the flow of the fluid thereagainst to provide an opening through the partition wall for the passage of fluid therethrough.

2. In a fitting of the character described, oppositely disposed interiorly threaded tubular ends, one of said tubular ends having a peripheral flange and the other having an exteriorly threaded portion, a nut having an axial bore and formed with an inwardly directed annular flange at one end and an interiorly threaded portion at the opposite end and adapted to engage the peripheral flange and the exteriorly threaded portion of the tubular ends for coupling the tubular ends together, a sleeve fitted within said nut, and a valve element of disk-shaped formation consisting of a peripheral rim surrounded by and connected with a bowed resilient partition wall disposed transversely of the flow of the fluid through said nut and located at one end of said sleeve with said peripheral rim secured between said end of the sleeve and one of said tubular ends, said partition wall being slitted to provide flexible sectors each connected with said partition wall and adapted to resiliently flex to spread the sectors apart with the pressure of the flow of the fluid thereagainst to provide an opening through the partition wall for the passage of fluid therethrough and said sectors having outwardly directed flanges along their edges for preventing too free flexing of the sectors and for tensioning the sectors to return to closed unflexed relation when the pressure of the flow of the fluid ceases.

3. In a check valve, a union consisting of oppositely disposed threaded tubular members, a connecting member having an axial bore, said connecting member and tubular members having interengageable means for coupling the said members together with the connecting member disposed in surrounding relation with the adjacent ends of the tubular members, a valve element of disk-shaped formation consisting of a peripheral rim surrounded by and connected with a shallow bowed resilient partition wall disposed transversely of the flow of the fluid through said union and secured in position between said tubular members, and an apertured plate seated on said peripheral rim and disposed transversely of the flow of the fluid in narrowly spaced relation from said bowed partition wall to provide a backing therefor, said partition wall being slitted to provide flexible sectors adapted to resiliently flex to spread the sectors apart with the pressure of the flow of the fluid thereagainst to provide an opening through the partition wall for the passage of fluid therethrough, and said sectors having outwardly directed flanges along their edges for preventing too free flexing of the sectors and for tensioning the sectors to return to closed unflexed relation when the pressure of the flow of the fluid ceases.

JOHN J. DELANY.

References Cited in the file of this patent

UNITED STATES PATENTS

| Number | Name | Date |
|---|---|---|
| 404,969 | Hattersley | June 11, 1889 |
| 803,979 | Bonnell | Nov. 7, 1905 |
| 1,764,186 | Teesdale | June 17, 1930 |
| 2,092,757 | Groeniger | Sept. 14, 1937 |
| 2,322,631 | Groeniger | June 22, 1943 |
| 2,347,988 | Burke | May 2, 1944 |
| 2,371,449 | Langdon | Mar. 13, 1945 |
| 2,378,384 | Baker | June 19, 1945 |
| 2,382,427 | Langdon | Aug. 14, 1945 |
| 2,524,764 | Burke | Oct. 10, 1950 |

FOREIGN PATENTS

| Number | Country | Date |
|---|---|---|
| 56,402 | Netherlands | of 1944 |